United States Patent
Nagata et al.

(10) Patent No.: US 7,531,817 B2
(45) Date of Patent: May 12, 2009

(54) SCINTILLATOR PANEL

(75) Inventors: Yasushi Nagata, Kodaira (JP); Masashi Kondo, Hachioji (JP); Mitsuru Sekiguchi, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/846,060

(22) Filed: Aug. 28, 2007

(65) Prior Publication Data

US 2008/0054183 A1    Mar. 6, 2008

(30) Foreign Application Priority Data

Sep. 5, 2006    (JP) ............................ 2006-239970

(51) Int. Cl.
*G01J 1/58* (2006.01)

(52) U.S. Cl. .................................................. 250/483.1

(58) Field of Classification Search ............... 250/483.1
See application file for complete search history.

(56) References Cited

U.S. PATENT DOCUMENTS

| | | | | |
|---|---|---|---|---|
| 4,415,605 A | * | 11/1983 | Davis et al. | ................... 427/65 |
| 6,835,940 B2 | * | 12/2004 | Morikawa et al. | ......... 250/484.4 |
| 2002/0005489 A1 | * | 1/2002 | Kasuyama et al. | .......... 250/368 |

* cited by examiner

*Primary Examiner*—David P Porta
*Assistant Examiner*—Kiho Kim

(57) ABSTRACT

An objective is to provide a scintillator panel by which a converted light signal can be efficiently transmitted to suitably realize an FPD exhibiting a high radiation-to-light conversion efficiency. Also provided is a scintillator panel possessing a substrate and provided thereon, a phosphor layer possessing columnar crystals made of cesium iodide, wherein a columnar crystal tip angle is 40-80°. Further, the above-described phosphor is preferably formed via vacuum evaporation.

3 Claims, 2 Drawing Sheets

30°

X-ray

60°

X-ray

90°

X-ray

150°

X-ray

SCINTILLATOR PANEL

This application claims priority from Japanese Patent Application No. 2006-239970 filed on Sep. 5, 2006, which is incorporated hereinto by reference.

TECHNICAL FIELD

The present invention relates to a scintillator panel, and specifically to a scintillator panel exhibiting a high radiation-to-light conversion efficiency.

BACKGROUND

Radiation images such as X-ray images have been widely used for diagnoses of medical conditions in medical sites. In recent years, a radiation imaging system equipped with a radiation detector has become popular. This system acquires two-dimensional image data through radiation as an electrical signal by the radiation detector, and processes this signal to be displayed on a monitor.

A scintillator panel plays a role in converting incident radiation from the substrate side to light. A flat panel detector (FPD) developed in the 1990s as an imaging device for radiation images is a radiation detector combined with a scintillator and an imaging device. As a material for this scintillator, cesium iodide (CsI) is commonly used. The reason of it is to suppress scattering of emission light because of optical guide effect, since CsI exhibits a high X-ray-to-visible light conversion efficiency, whereby a columnar crystal structure can be easily formed via vacuum evaporation (refer to Patent Document 1, for example).

As a method of preparing such the radiation detector, commonly known is a method of forming CsI directly on an imaging device via vacuum evaporation (refer to Patent Documents 2 and 3, for example). There is another possible method in which a scintillator panel adheres to an imaging device (refer to Patent Document 4, for example).

However, in each case, designing of a phosphor layer to transmit a light signal converted by a scintillator efficiently has not been tested.

(Patent Document 1) Japanese Patent O.P.I. Publication No. 5-93780

(Patent Document 2) Japanese Patent O.P.I. Publication No. 5-312961

(Patent Document 3) Japanese Patent O.P.I. Publication No. 6-331749

(Patent Document 4) Japanese Patent O.P.I. Publication No. 2003-66196

SUMMARY

It is an object of the present invention to provide a scintillator panel in which a converted light signal is efficiently transmitted. This scintillator panel is suitably utilized to realize an FPD exhibiting a high radiation-to-light conversion efficiency.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DESCRIPTION OF THE PREFERRED EMBODIMENTS

The above object of the present invention is accomplished by the following structures.

(Structure 1) A scintillator panel comprising a substrate and provided thereon, a phosphor layer comprising columnar crystals made of cesium iodide, wherein a columnar crystal tip angle is 40-80°.

(Structure 2) The scintillator panel of Structure 1, comprising the phosphor layer formed via vapor deposition.

(Structure 3) The scintillator panel of Structure 2, wherein the vapor deposition is vacuum evaporation.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

Next, the present invention will be described in detail.

Figure 1A:
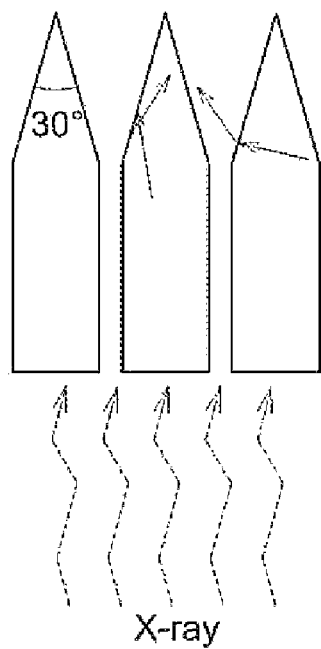
FIG. 1(a) is a schematic diagram showing CsI columnar crystals having a tip angle of 30°.
Figure 1B:
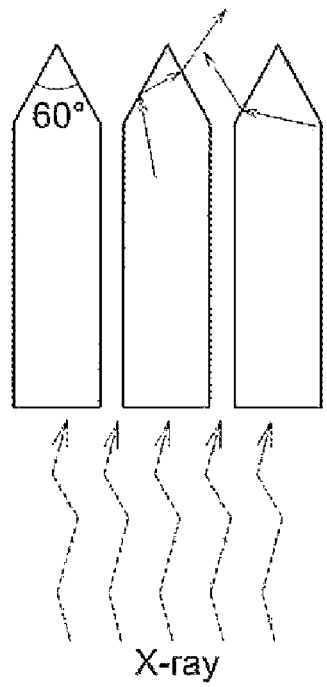
FIG. 1(b) is a schematic diagram showing CsI columnar crystals having a tip angle of 60°.
Figure 1C:
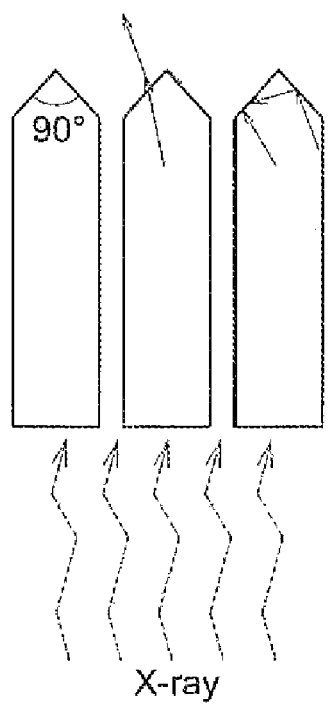
FIG. 1(c) is a schematic diagram showing CsI columnar crystals having a tip angle of 90°.
Figure 1D:
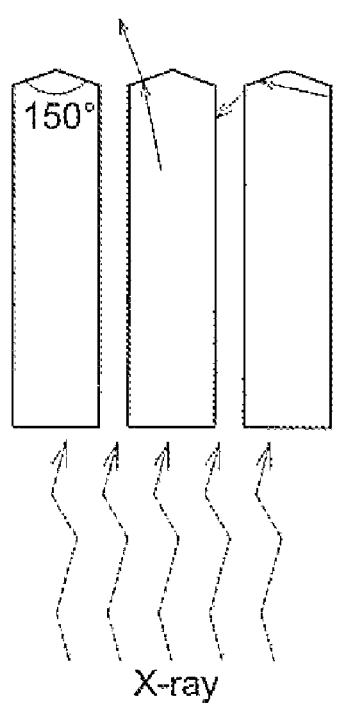
FIG. 1(d) is a schematic diagram showing CsI columnar crystals having a tip angle of 150°.

FIG. 1(a) is a schematic diagram showing CsI columnar crystals having a tip angle of 30°, FIG. 1(b) is a schematic diagram showing CsI columnar crystals having a tip angle of 60°, FIG. 1(c) is a schematic diagram showing CsI columnar crystals having a tip angle of 90°, and FIG. 1(d) is a schematic diagram showing CsI columnar crystals having a tip angle of 150°. Light emitted via irradiation from the lower side of CsI columnar crystals with X-ray is efficiently transmitted to the tip portion side of CsI columnar crystals because of the optical guide effect of CsI. Light reaching the tip portion of the crystal is taken out of the crystal, but in the case of a columnar crystal tip angle of 30°, 90° or 150°, for example (any of the angles outside of the scope of the present invention), total reflection is produced inside the crystal depending on the direction of light reaching the crystal tip portion, whereby an amount of light taken from the crystal tip portion is reduced. In this way, light taken-out efficiency largely varies by controlling the columnar crystal tip angle.

This columnar crystal tip angle can be measured employing a secondary electron scanning microscope.

As a method of growing columnar crystals via vapor deposition of CsI, a vacuum evaporation method, a sputtering method and a CVD method are utilized, but of these, a vacuum evaporation method is preferable.

As for a vacuum evaporation method, the inside of the apparatus is evacuated to set a vacuum evaporation to approximately $1.0 \times 10^{-4}$ Pa, after a support is placed in an evaporator, and at least one phosphor material is subsequently heated for vacuum evaporation by means of a resistance heating method or an electron beam method to obliquely deposit a phosphor layer of desired thickness on the support surface. As the result, a phosphor layer containing no binder is formed, but the foregoing vacuum evaporation process is also possible to be divided into a plurality of steps to form a phosphor layer. Vacuum evaporation can be carried out employing a plurality of resistance heaters or electron beam for the foregoing process. Further, in a vacuum evaporation process, phosphor raw material is evaporated employing a plurality of resistance heaters or electron beam, and a phosphor layer is possible to be formed while synthesizing an intended phosphor on a support. Furthermore, in the vacuum evaporation method, evaporated material may also be cooled or heated during vacuum evaporation, if desired. After completing vacuum evaporation, the phosphor layer may also be heat-treated.

Figure 2:
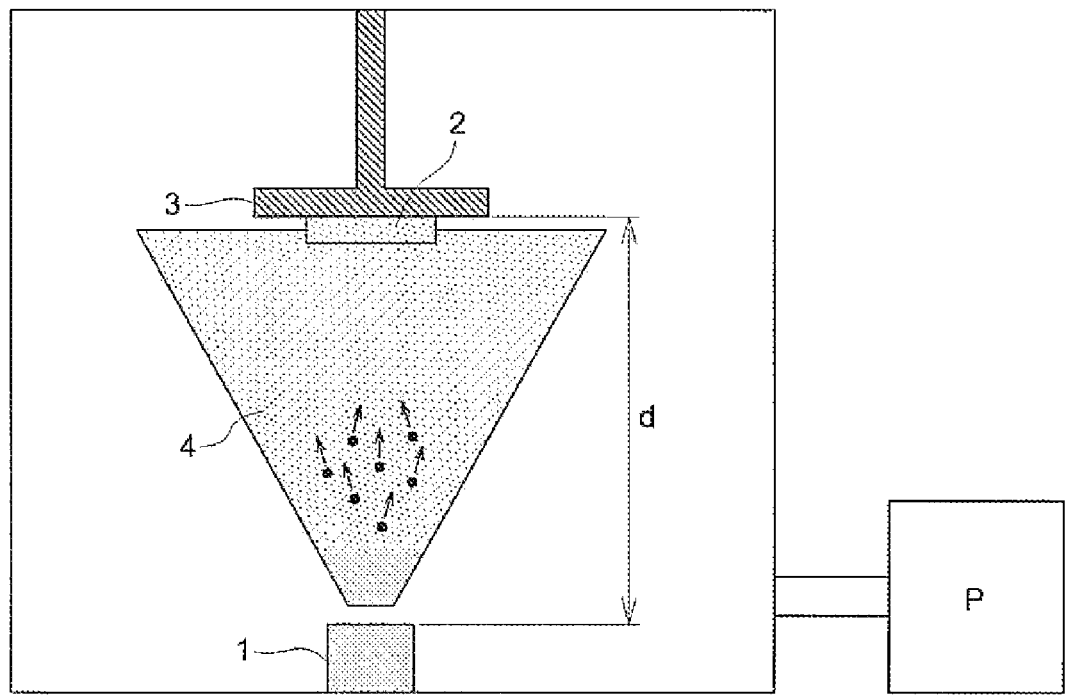
FIG. 2 is a cross sectional view showing an evaporator of the present invention to evaporate CsI.

FIG. 2 is a cross-sectional view showing an example of an evaporator to evaporate CsI. CsI is filled in resistance heating crucible 1, and substrate 2 is placed on rotatable holder 3 to adjust distance d between the rotatable holder and the resistance heating crucible. The inside of the evaporator is evacuated employing pump P, and inert gas is subsequently introduced to adjust a vacuum degree. Next, temperature of the holder is arranged to be adjusted while rotating support 3. Then, resistance heating crucible 1 is heated to evaporate CsI vapor stream 4 onto substrate 2 (a phosphor layer formed on substrate 2), and vacuum evaporation is terminated when this phosphor layer reaches desired thickness.

The crucible is preferably made of Mo, and the substrate is preferably made of a polyimide resin. The holder is preferably formed from a thin aluminum plate, and an appropriate heating temperature thereof is room-temperature-350° C., but preferably 100-250° C. An vacuum degree of 0.001-10 Pa is appropriate, and is adjusted by introducing inert gas such as argon or nitrogen.

EXAMPLE

Next, the present invention is described referring to examples, but embodiments of the present invention are not limited thereto.

A CsI phosphor layer was evaporated onto a polyimide substrate of a square, 10 cm on a side having a thickness of 0.2 mm by the following procedure, employing an evaporator in FIG. 2.

The holder is formed from an Al plate having a thickness of 1 mm, and a distance between the holder and the resistance heating Mo crucible was adjusted to 40 cm. The inside of the evaporator was evacuated employing pump P, and Ar gas is subsequently introduced to adjust a vacuum degree to 0.5 Pa. Next, temperature of the holder was maintained under each of the conditions of room-temperature-350° C. while rotating the support at a speed of 10 rpm to prepare each of samples. Then, the resistance heating crucible was heated to evaporate phosphor (CsI), and vacuum evaporation was terminated when the phosphor layer reached a thickness of 500 μm.

A phosphor layer evaporated onto a polyimide substrate (CsI columnar crystals) was attached to the surface of a photodiode (photoelectric conversion element) provided in the form of lattices on a glass substrate to obtain a scintillator panel.

As for a scintillator panel obtained in such a manner, intensity of light emitted upon exposure to X-ray (a tube voltage of 80 ekvp) was measured, and a ratio was calculated and determined as a radiation-to-light conversion efficiency in comparison to a sample exhibiting the highest intensity of emitted light. Then, CsI columnar crystal tip angle (°) of a phosphor layer was observed at a magnification of 2000 times employing a secondary electron scanning microscope (S-800, manufactured by Hitachi Ltd.).

Figure 3:
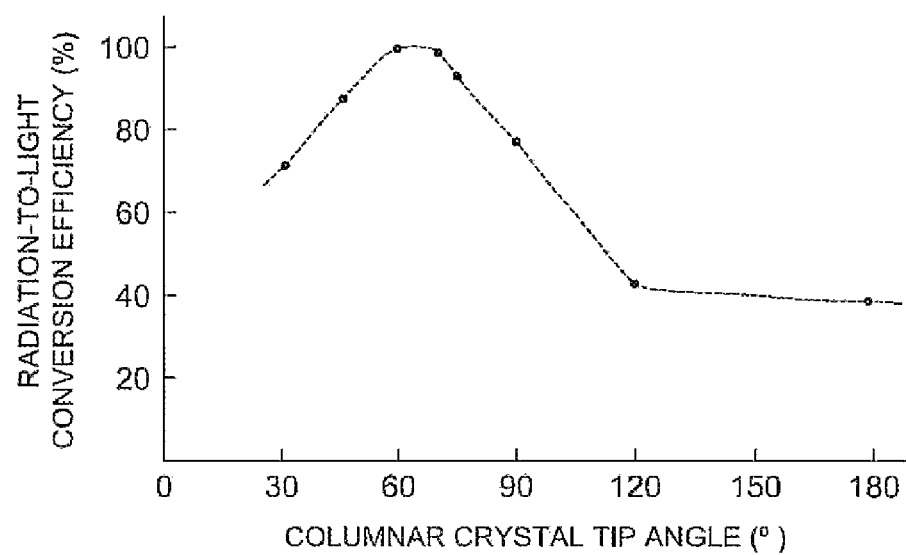
FIG. 3 is a graph exhibiting a relationship between radiation-light conversion efficiency (%) and CsI columnar crystal tip angle (°) in a scintillator panel of the present invention.

A relationship between radiation-to-light conversion efficiency (%) and CsI columnar crystal tip angle (°) is shown in FIG. 3.

As is clear from this result, it is to be understood that the highest radiation-to-light conversion efficiency was exhibited at a holder temperature of 150° C. during vacuum evaporation through preparation of a phosphor layer by controlling a holder temperature from room temperature to 350° C., and the CsI columnar crystal tip angle was 60° in this case. It was confirmed that the radiation-to-light conversion efficiency was 80% or higher in the CsI columnar crystal tip angle range of 40-80° resulting in higher radiation-to-light conversion efficiency in comparison to that in the other range, and also 90% or higher in the CsI columnar crystal tip angle range of 50-75° resulting in still higher radiation-to-light conversion efficiency in comparison to that in the other range.

EFFECT OF THE INVENTION

A converted light signal can be efficiently transmitted by a scintillator panel of the present invention to realize an FPD exhibiting a high radiation-to-light conversion efficiency.

What is claimed is:

1. A scintillator panel comprising:
a substrate and provided thereon, a phosphor layer comprising columnar crystals made of cesium iodide,
the scintillator panel having a radiation-to-light conversion efficiency of 80-100% at a cesium iodide columnar crystal tip angle of 40-80°.

2. The scintillator panel of claim 1, comprising the phosphor layer formed via vapor deposition.

3. The scintillator panel of claim 2, wherein the vapor deposition is vacuum evaporation.

* * * * *